United States Patent
Toyama et al.

(10) Patent No.: US 10,248,629 B2
(45) Date of Patent: Apr. 2, 2019

(54) METHOD FOR DETERMINING WIRING RISK AND WIRING RISK DETERMINATION SYSTEM

(71) Applicant: MITSUBISHI AIRCRAFT CORPORATION, Aichi (JP)

(72) Inventors: Koji Toyama, Tokyo (JP); Satoshi Suehiro, Tokyo (JP); Yoshihiro Nakayama, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 863 days.

(21) Appl. No.: 14/032,672

(22) Filed: Sep. 20, 2013

(65) Prior Publication Data

US 2014/0088919 A1 Mar. 27, 2014

(30) Foreign Application Priority Data

Sep. 24, 2012 (JP) .................................. 2012-209317

(51) Int. Cl.
*G06F 17/50* (2006.01)
*G06F 17/18* (2006.01)
*G06Q 10/06* (2012.01)

(52) U.S. Cl.
CPC ............ *G06F 17/18* (2013.01); *G06F 17/509* (2013.01); *G06F 2217/36* (2013.01); *G06Q 10/0635* (2013.01)

(58) Field of Classification Search
CPC ................................ G01R 31/08; G06F 17/18

USPC .......................................... 702/181; 716/136
See application file for complete search history.

(56) References Cited

U.S. PATENT DOCUMENTS

| 7,050,936 B2 * | 5/2006 | Levy ..................... G06F 11/008 702/179 |
| 7,536,284 B2 | 5/2009 | Linzey et al. |
| 2004/0176862 A1 * | 9/2004 | Tsuchiya ............... G06F 17/509 700/97 |
| 2007/0050178 A1 * | 3/2007 | Linzey ................... G06Q 50/30 703/2 |
| 2009/0265059 A1 * | 10/2009 | Medwin ................ B66F 9/0755 701/31.4 |
| 2009/0265119 A1 * | 10/2009 | Bhattacharya ......... G06Q 10/06 702/34 |
| 2013/0009649 A1 * | 1/2013 | Sasaki ................. B60R 16/0207 324/538 |

* cited by examiner

*Primary Examiner* — Mohamed Charioui
*Assistant Examiner* — Christine Y Liao
(74) *Attorney, Agent, or Firm* — Pearne & Gordon LLP (57) ABSTRACT

A method for determining a wiring risk is a method for determining a first risk that electric wires connected to a plurality of terminal devices are bundled into a single harness, and a second risk that harnesses fail at the same time, wherein the first risk is determined by identifying the number of connectors to which a target harness identified from the plurality of harnesses is indirectly connected, and the second risk is determined by matching location information of the target harness to an influenced area by a hazard source, and identifying whether the target harness passes through the influenced area.

18 Claims, 11 Drawing Sheets

| No. | SYS ID | System name | Item Number | LEVEL A | LEVEL B | MAJOR | MINOR |
|---|---|---|---|---|---|---|---|
| 1 | SYS21 | ENVIRONMENTAL CONTROL | 20 | 6 | 2 | ⋮ | ⋮ |
| 2 | SYS22 | AUTO FLIGHT | 32 | 6 | 4 | ⋮ | ⋮ |
| 3 | SYS23 | COMMUNICATIONS | 10 | 0 | 0 | ⋮ | ⋮ |
| 4 | SYS24 | ELECTRICAL POWER | 4 | 2 | 0 | ⋮ | ⋮ |
| 5 | SYS25 | EQUIPMENT / FURNISHINGS | 29 | 2 | 8 | ⋮ | ⋮ |
| 6 | SYS26 | FIRE PROTECTION | 13 | 8 | 2 | ⋮ | ⋮ |
| 7 | SYS27 | FLIGHT CONTROLS | 48 | 13 | 12 | 13 | 10 |
| 8 | SYS28 | FUEL | 21 | 5 | 2 | ⋮ | ⋮ |
| 9 | SYS29 | HYDRAULIC POWER | 9 | 5 | 1 | ⋮ | ⋮ |
| 10 | SYS30 | ICE AND RAIN PROTECTION | 11 | 5 | 0 | ⋮ | ⋮ |
| 11 | SYS31 | INDICATING/RECORDING SYSTEMS | 13 | 4 | 2 | ⋮ | ⋮ |
| 12 | SYS32 | LANDING GEAR | 9 | 6 | 0 | ⋮ | ⋮ |
| 13 | SYS33 | LIGHTS | 9 | 0 | 0 | ⋮ | ⋮ |
| 14 | SYS34 | NAVIGATION | 19 | 5 | 3 | ⋮ | ⋮ |
| 15 | SYS35 | OXYGEN | 10 | 2 | 3 | ⋮ | ⋮ |
| 16 | SYS36 | PNEUMATIC | 6 | 2 | 0 | ⋮ | ⋮ |
| 17 | SYS38 | WATER / WASTE | 2 | 0 | 0 | ⋮ | ⋮ |
| 18 | SYS44 | CABIN SYSTEM | 2 | 0 | 0 | ⋮ | ⋮ |
| 19 | SYS45 | CENTRAL MAINTENANCE SYSTEM (CMS) | 2 | 0 | 0 | ⋮ | ⋮ |
| 20 | SYS46 | INFORMATION SYSTEM | 4 | 1 | 0 | ⋮ | ⋮ |
| 21 | SYS47 | INERT GAS SYSTEM | 8 | 4 | 0 | ⋮ | ⋮ |
| 22 | SYS49 | AIRBORNE AUXILIARY POWER | 5 | 1 | 0 | ⋮ | ⋮ |
| 23 | SYS50 | CARGO AND ACCESSORY COMPARTMENT | 12 | 3 | 3 | ⋮ | ⋮ |
| 25 | SYS70 | STANDARD PRACTICES-ENGINE | 37 | 16 | 3 | ⋮ | ⋮ |

| Device ID | Device Name | LEVEL |
|---|---|---|
| SYS270101 | PFCC | A |
| SYS270201 | ACE | A |
| SYS270301 | SREU | A |
| SYS273801 | AOA SNSR | A |
| SYS274201 | HSCU | A |
| SYS275201 | FSECU | A |
| SYS30 | Anti-ice data | A |
| SYS314301 | DMC | A |
| SYS31 | Indicating System | A |
| SYS32 | WOW | A |
| SYS34 | Air data | A |
| SYS34 | Attitude data | A |
| SYS70 | Thrust position data | A |

FIG. 7

| Comp. ID | Component name |
|---|---|
| 270201 | Actuator Control Electronics 1 |
| 270201 | Actuator Control Electronics 2 |
| 270301 | Spoiler Remote Electronics Unit |
| ⋮ | ⋮ |

FIG. 8

| No. | Cone. ID | Harness ID |
|---|---|---|
| 1 | P27101 | 9121511 |
| 2 | P27103 | 9121510 |
| 3 | P27100 | 9121515 |
| 4 | P27102 | 9121516 |
| 5 | P27088 | 9121516 |

FIG. 9

| No. | Harness ID | Connector No. | Connector Combination ||||| One-Bundle Risk Value | Evaluation |
|---|---|---|---|---|---|---|---|---|---|
|   |   |   | 1 | 2 | 3 | 4 | 5 |   |   |
| 1 | 9111503 |   | 1 | 2 | 3 | 4 | 5 | 5 | One-Bundle Possibility |
| 2 | 9111501 |   | 1 | 2 | 3 | 4 | 5 | 5 | |
| 3 | 9121503 |   | 1 |   |   |   | 5 | 2 | |
| 4 | 9111506 |   | 1 |   | 3 | 4 | 5 | 4 | |
| 5 | 9111507 |   | 1 | 2 | 3 | 4 | 5 | 5 | |
| 6 | 9121503 |   | 1 | 2 | 3 | 4 | 5 | 5 | |
| 7 | 9151507 |   | 1 |   |   |   | 5 | 2 | |
| 8 | 9121508 |   | 1 | 2 |   |   |   | 2 | |
| 9 | 9151501 |   | 1 |   |   |   | 5 | 2 | |
| 10 | 9121502 |   | 1 | 2 | 3 |   |   | 3 | |
| 11 | 9121506 |   | 1 |   | 3 | 4 |   | 3 | |
| 12 | 9151506 |   | 1 |   | 3 | 4 |   | 3 | |
| 13 | 9121516 | 4 | 1 | 2 | 3 |   |   | 3 | |
| 14 | 9121515 | 3 | 1 | 2 |   | 4 | 5 | 4 | |
| 15 | 9111504 |   | 1 | 2 | 3 | 4 | 5 | 5 | |
| 16 | 9111508 |   | 1 | 2 | 3 | 4 | 5 | 5 | |
| 17 | 9121510 | 2 | 1 |   | 3 | 4 | 5 | 4 | |
| 18 | 9121420 |   | 1 | 2 |   |   | 5 | 3 | |
| 19 | 9151505 |   |   | 2 | 3 |   |   | 2 | |
| 20 | 9121514 |   |   | 2 | 3 | 4 | 5 | 4 | |
| 21 | 9121511 | 1 |   | 2 | 3 | 4 | 5 | 4 | |
| 22 | 9121513 |   |   | 2 | 3 | 4 | 5 | 4 | |
| 23 | 9121430 |   |   | 2 | 3 | 4 | 5 | 4 | |
| 24 | 9121505 |   |   |   | 3 |   | 5 | 2 | |
| 25 | 9121507 |   |   |   | 3 | 4 | 5 | 3 | |
| 26 | 9151508 |   |   |   | 3 |   | 5 | 2 | |
| 27 | 9121509 |   |   |   | 3 | 4 |   | 2 | |
| 28 | 9151503 |   |   |   | 3 |   | 5 | 2 | |
| 29 | 9121413 |   |   |   | 3 | 4 |   | 2 | |
| 30 | 9111505 |   |   |   |   | 4 | 5 | 2 | |
| 31 | 9131504 |   | 1 |   |   |   |   | 1 | Accepted |
| 32 | 9131511 |   | 1 |   |   |   |   | 1 | |
| 33 | 9111502 |   |   | 2 |   |   |   | 1 | |
| 34 | 9131501 |   |   | 2 |   |   |   | 1 | |
| 35 | 9171505 |   |   | 2 |   |   |   | 1 | |
| 36 | 9131516 |   |   | 2 |   |   |   | 1 | |
| 37 | 9131512 |   |   | 2 |   |   |   | 1 | |
| 38 | 9131509 |   |   |   | 3 |   |   | 1 | |
| 39 | 9131513 |   |   |   | 3 |   |   | 1 | |
| 40 | 9131506 |   |   |   |   | 4 |   | 1 | |
| 41 | 9131515 |   |   |   |   | 4 |   | 1 | |
| 42 | 9171507 |   |   |   |   | 4 |   | 1 | |
| 43 | 9131514 |   |   |   |   | 4 |   | 1 | |

FIG. 10

| Harness ID | Wire. ID | Conc. ID | |
|---|---|---|---|
| | | ITEM1 | ITEM2 |
| 9111503 | CK0010 | P27101 | P76100 |
| 9111503 | CK0011 | P27101 | P76100 |
| ⋮ | ⋮ | ⋮ | ⋮ |
| 9111503 | CK0015 | P27088 | P27066 |
| 9111503 | CK0016 | P27088 | P241102 |
| 9111501 | CE0001 | P27102 | P76100 |
| ⋮ | ⋮ | ⋮ | ⋮ |
| 9111503 | CE0003 | P27102 | P24092B |
| 9121503 | CF0001 | P27103 | P76100 |
| ⋮ | ⋮ | ⋮ | ⋮ |
| 9121503 | CF0005 | P27103 | P76100 |
| ⋮ | ⋮ | ⋮ | ⋮ |
| 9111505 | CH0001 | P27105 | P76125 |

FIG. 11

| Harness | Harness ID | Location Information (x, y, z) |
|---|---|---|
| A | 9121511 | $(x_2, y_3, z_2)$ |
| B | 9121510 | $(x_4, y_5, z_6)$ |
| C | 9121515 | $(x_2, y_3, z_6)$ |

FIG. 12

| Haz. ID | Haz. Name | Incid. Portion | Inf. Area |
|---|---|---|---|
| B001 | Bleed Air Leakage | Vent | $(x_{1\sim5}, y_{1\sim5}, z_{1\sim5})$ |
| B002 | Bleed Air Leakage | Coupling | $(x_{3\sim7}, y_{4\sim8}, z_{5\sim8})$ |
| B003 | Bleed Air Leakage | Cover | $(x_{1\sim2}, y_{2\sim3}, z_{9\sim10})$ |
| ⋮ | ⋮ | ⋮ | ⋮ |

FIG. 13

| Harness | Simultaneous Failure Risk Value |
|---|---|
| A | 1 |
| B | 1 |
| C | 0 |

FIG. 14

| Harness | Simultaneous Failure Risk |
|---|---|
| A * B | 1 |
| A * C | 0 |
| B * C | 0 |

# METHOD FOR DETERMINING WIRING RISK AND WIRING RISK DETERMINATION SYSTEM

BACKGROUND OF THE INVENTION

Field of the Invention

The present invention relates to a method and a system for extracting (1) a harness having a risk (one-bundle risk) that a combination of electric wires, which should not fail at the same time, are included in a single wire harness (simply referred to as harness below), and (2) harnesses having a risk to impair the safety when failing at the same time, so as to analyze the safety of wiring in which a plurality of electronics are connected by electric wires via connectors.

Description of the Related Art

For example, as for systems in which an input device, a control device, and an output device are connected by a harness, it is necessary to check whether the harness is wired with required safety before the system is constructed and actually used. Particularly, in aircraft, the safety deeply involves human lives, and thus, it is essential to confirm the safety. However, when a large-scale system is employed, there are a large number of harnesses (a large number of wirings), and a large number of terminal devices such as input devices, or relay devices (collectively referred to as terminal device below). Thus, the safety of wiring cannot be easily confirmed. In aircraft, redundancy is imparted to electronics (terminal devices) and electric wires so as to guarantee the safety, which also makes it more difficult to confirm the safety.

U.S. Pat. No. 7,536,284 proposes a method for quantitatively evaluating the safety. As for a system or a component, quantitative safety analysis using a failure rate can be generally performed. Meanwhile, as for wiring, wiring failure analysis using an arc fault is required. However, the failure rate cannot be analytically obtained by calculations due to the probability of an arc phenomenon. In the quantitative safety analysis, it is also not possible to confirm that redundancy is ensured.

The present invention has been made based on such problems, and an object thereof is to contribute to safety analysis of wiring by providing a method for easily extracting a harness having a one-bundle risk, and harnesses having a risk to impair the safety when failing at the same time even in a large-scale wiring system including a large number of harnesses (electric wires) and terminal devices.

SUMMARY OF THE INVENTION

Information indicating connection of any complicated wiring can be summarized into either (a) or (b) described below.

(a) A connector and an electric wire (b) A connector and a terminal device or a relay device Therefore, a connection state can be obtained by making a database of the relationship of the electric wire, and the terminal device or the relay device connected to the connector, and tracing a connection route.

Whether a certain harness passes through an influenced area by a hazard source as a cause of failure can be also easily obtained by making a database of location information of the influenced area, and location information of a wired harness.

To achieve the above object, the present invention relates to a method for determining a first risk that electric wires connected to a plurality of terminal devices are bundled into a single harness, and a second risk that harnesses fail at the same time in a wiring system in which the plurality of harnesses each as a bundle of electric wires are provided between the plurality of terminal devices and connected via connectors.

The first risk is determined by identifying the number of connectors to which a target harness identified from the plurality of harnesses is indirectly connected.

The second risk is determined by matching location information of the target harness to an influenced area by a hazard source, and identifying whether the target harness passes through the influenced area.

In the determination of the first risk according to the present invention, identification information of an electric wire bundled in the target harness, the electric wire having a risk value corresponding to the identified number of connectors equal to or larger than a predetermined value, may be extracted.

In the determination of the first risk according to the present invention, identification information of a node as a branching portion of the target harness, the node having a risk value corresponding to the identified number of connectors equal to or larger than a predetermined value, may be extracted.

Moreover, in the determination of the second risk according to the present invention, the second risk of two target harnesses may be obtained by calculating respective risk values indicating that the two target harnesses pass through the influenced area.

These methods are used for facilitating evaluation of an influence rate when there occurs a failure. These methods can be applied to a determination system below.

The present invention provides a following determination system which executes the method for determining a wiring risk described above.

The determination system determines a first risk that electric wires connected to a plurality of terminal devices are bundled into a single harness, and a second risk that harnesses fail at the same time in a wiring system in which the plurality of harnesses each as a bundle of electric wires are provided between the plurality of terminal devices and connected via connectors.

The system includes a database that stores connection information between the connector and the harness, and location information of the harnesses and information on an influenced area by a hazard source, and a processing unit that determines the first risk and the second risk. When a target harness identified from the plurality of harnesses is specified, the processing unit identifies the number of connectors to which the target harness is indirectly connected based on the connection information so as to determine the first risk, and matches the location information of the target harness to the influenced area information, and identifies whether the target harness passes through the influenced area so as to determine the second risk.

In accordance with the present invention, a harness having a one-bundle risk, and harnesses having a risk to impair the safety when failing at the same time can be easily extracted by using the connection information indicating a connection relationship between the connectors and the harnesses.

DETAILED DESCRIPTION OF THE PREFERRED EMBODIMENT

In the following, the present invention will be described in detail based on an embodiment shown in the accompanying drawings.

Figure 1:
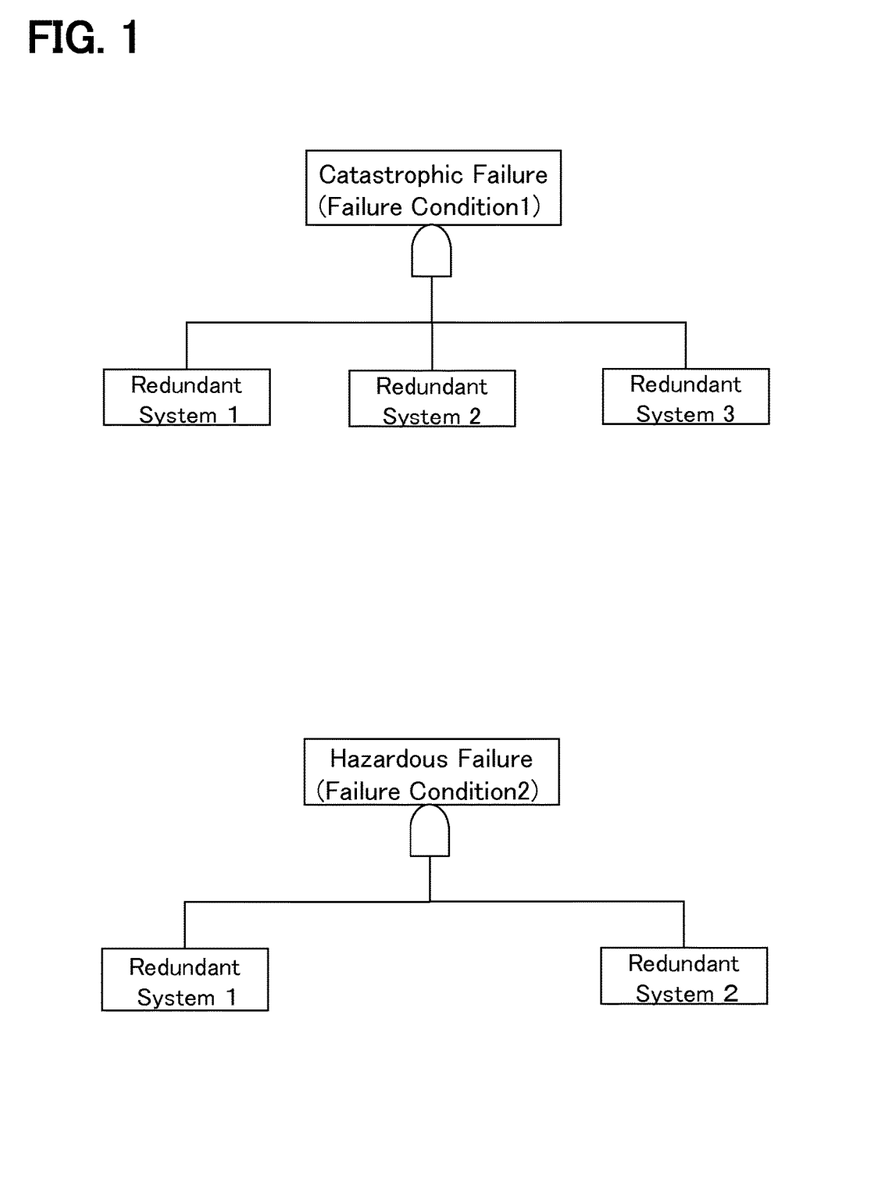
FIG. 1 is a view illustrating the number of redundancies necessary for wiring.

An evaluation target extraction system 10 for harnesses according to the present embodiment sets the number of redundancies necessary for electric wires by employing the concept of fault tolerance as a qualitative analysis requirement. For example, as shown in FIG. 1, an extremely rare probability of incidence (e.g., equivalent of $10^{-9}$), which is a tolerable level as the probability of incidence, is achieved for an electric wire resulting in a "Catastrophic Failure" by ensuring at least three systems (three redundancies) independent of each other. Similarly, an extremely low probability of incidence (e.g., equivalent of $10^{-7}$), which is a tolerable level as the probability of incidence, is achieved for an electric wire resulting in a "Hazardous Failure" by ensuring at least two systems (two redundancies) independent of each other. It goes without saying that the required number of systems (the required degree of redundancy) may be set as appropriate.

A condition having a lower degree of hazard than the Catastrophic Failure and the Hazardous Failure is also defined as the failure condition. Examples thereof include "Major" and "Minor". It should be noted that these definitions are merely one example.

The redundant system in FIG. 1 needs to be reliably independent of an assumed failure cause. That is, even when three redundancies are ensured, electric wires branching from respective routes may be included in a single harness (one bundle). In this case, if a failure (loss) occurs in the bundle, the safety may not be guaranteed.

Figure 2A:
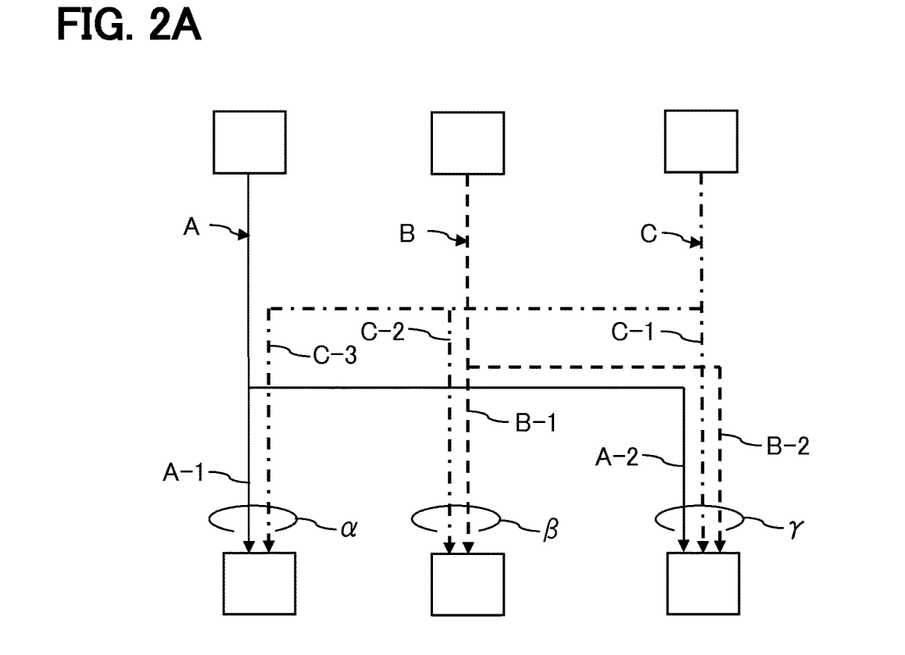
FIG. 2A is a view for explaining a one-bundle risk.

For example, a case in which wiring having three redundancies (three systems) composed of a route A, a route B, and a route C is provided as shown in FIG. 2A is assumed. The route A branches into a route A1 and a route A2. The route B branches into a route B1 and a route B2. The route C branches into a route C1, a route C2, and a route C3. The route A1 and the route C3 belong to one bundle α. The route B1 and the route C2 belong to one bundle β. The route C1, the route A2, and the route B2 belong to one bundle γ. That is, in this case, when the one bundle γ fails, the safety of the route A, the route B and the route C is reduced. Thus, it is necessary to evaluate whether or not a wiring system satisfies a safety standard by extracting a one-bundle harness (wiring) such as the one bundle γ.

Even when there is no harness in which a plurality of electric wires, which should not fail at the same time, are brought together in one bundle, such harnesses may be physically rigged adjacent to each other within an influenced area by an assumed hazard event. In this case, when the hazard event occurs, the safety may not be guaranteed.

Figure 2B:
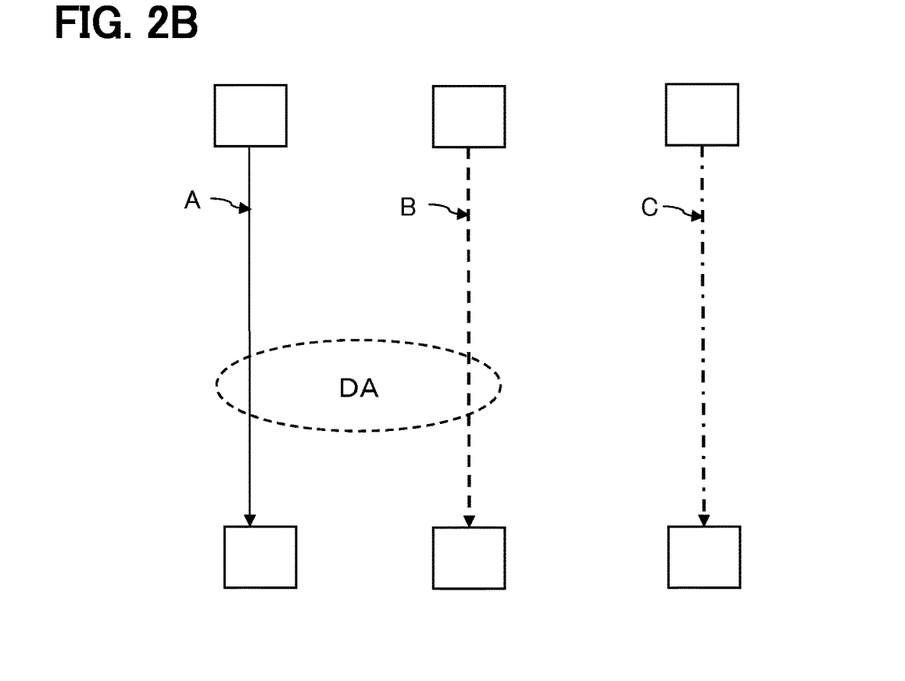
FIG. 2B is a view for explaining a simultaneous failure risk.

One example thereof is shown in FIG. 2B, in which two harnesses: a route A and a route B out of routes A to C pass through an influenced area DA by a hazard event. Thus, if the two routes A and B fail at the same time, there is a risk that the safety is impaired.

Therefore, the present embodiment provides the evaluation target extraction system 10 that extracts a harness (an evaluation target A) having a one-bundle possibility, and harnesses (an evaluation target B) having a risk to impair the safety when failing at the same time in the incidence of a hazard event.

The harness is an assembly of a connector and a bundle of electric wires (a bundle). Each electric wire is electrically connected to a pin (or a terminal) of the connector. A fuselage (in a case of aircraft) is rigged with the harness by fixing the harness with a clamp or the like.

The connector may be classified into a connector that connects a harness and a component (a terminal device, a relay device), and a connector that connects a harness and a harness.

The bundle is classified into two types described below. A harness, a connector, a bundle, a bundle section, and a node are respectively identified by identification information given thereto.

Bundle section: a minimum unit in the bundle composed of a single combination of electric wires.

Node: a branching portion of the bundle, and connected to the bundle section on both sides or one side.

Figure 3:
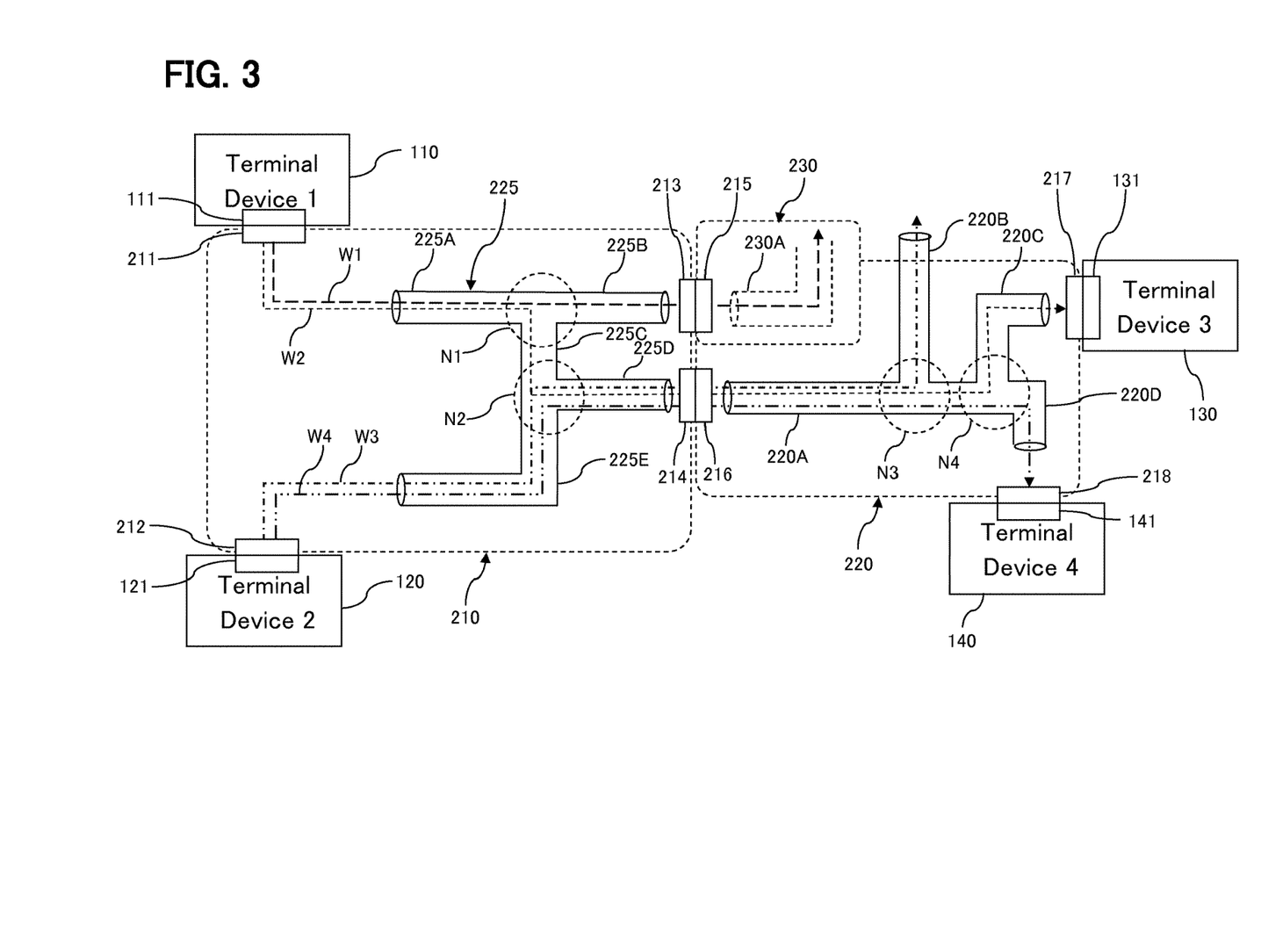
FIG. 3 is a block diagram illustrating a configuration example of a system in which terminal devices are connected by harnesses.

FIG. 3 shows one example of the wiring system. In the example in FIG. 3, four terminal devices 110 to 140 are provided, and three harnesses 210 to 230 are interposed among the terminal devices 110 to 140. The terminal devices 110 to 140 respectively include connectors 111 to 141 electrically connected to connectors 211 to 218 of the harnesses 210 to 230.

The harness 210 is provided with the connectors 211 and 212 connected to the terminal devices 110 and 120, and the connectors 213 and 214 functioning as a relay with the harnesses 220 and 230. A bundle 225 as a bundle of electric wires is interposed among the connectors 211 to 214. The connectors 213 and 214 are respectively connected to the connectors 215 and 216.

The bundle 225 includes five bundle sections 225A to 225E.

In the bundle section 225A, electric wires W1 and W2 connected to the connector 211 are bundled together. The bundle section 225A occupies a portion from the connector 211 to a node N1. Although only the two electric wires W1 and W2 are shown for facilitating understanding, it goes without saying that a plurality of electric wires exceeding two wires may be bundled into an actual harness. The same applies below.

The bundle section 225A branches into the bundle section 225B and the bundle section 225C at the node N1. The electric wire W1 of the bundle section 225A communicates with the bundle section 225B, and the electric wire W2 of the bundle section 225A communicates with the bundle section 225C. The bundle section 225B is connected to the harness 230 (the connector 215) via the connector 213.

In the bundle section 225E, electric wires W3 and W4 connected to the connector 212 are bundled together. The bundle section 225E occupies a portion from the connector 212 to a node N2. The bundle section 225E branches into the bundle section 225C described above and the bundle section 225D at the node N2. The electric wires W3 and W4 of the bundle section 225E communicate with the bundle section 225D. The electric wire W2 of the bundle section 225C also communicates with the bundle section 225D. The bundle section 225D is connected to the harness 220 (the connector 216) via the connector 214.

Since the configurations of the harnesses 220 and 230 can be understood by referring to the description of the harness 210, the detailed description thereof is omitted by assigning reference numerals.

FIG. 3 is used for facilitating understanding of the configuration of the wiring system including the harnesses. It goes without saying that a plurality of configurations illustrated in FIG. 3 may be combined together in a large-scale system.

Figure 4:
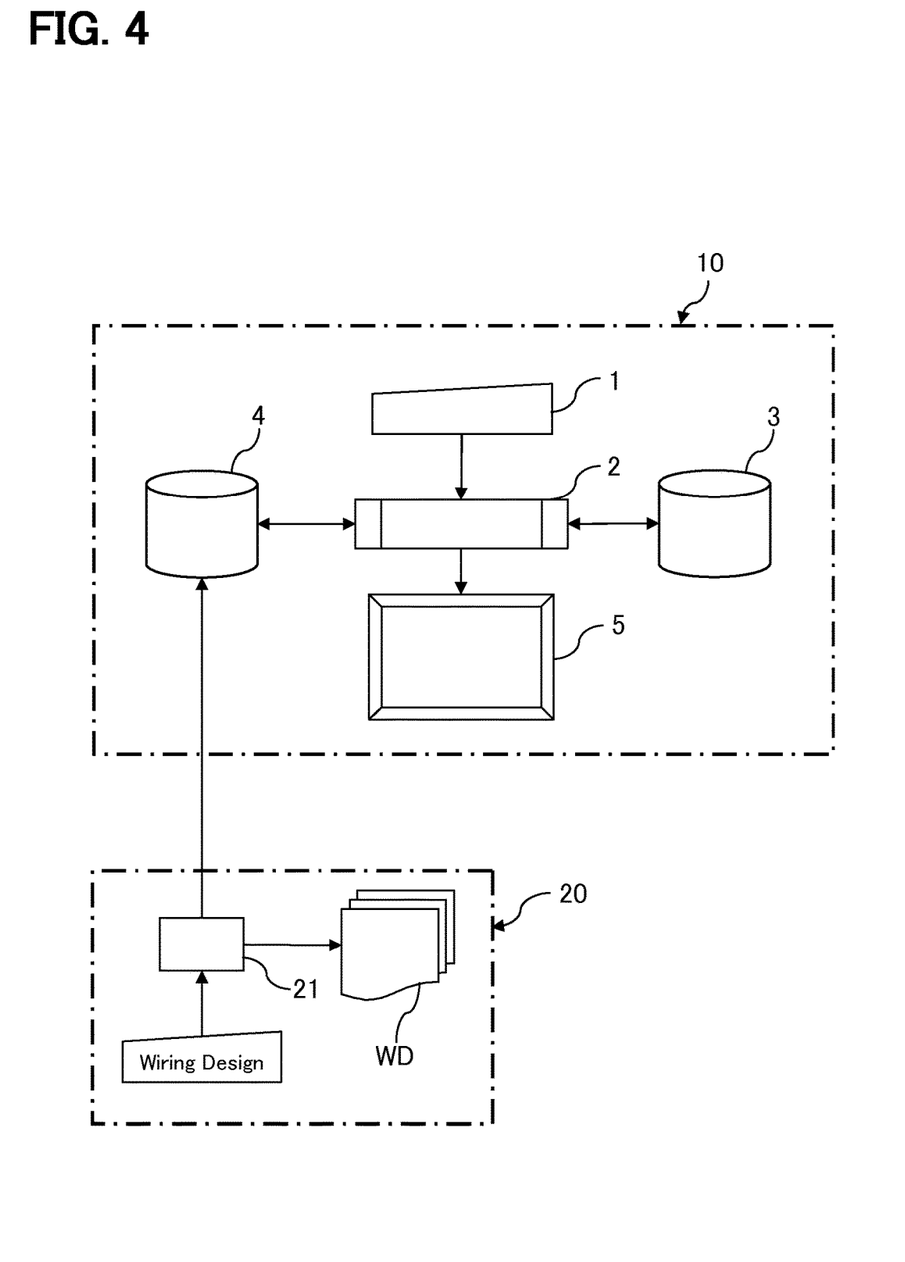
FIG. 4 is a view illustrating the configuration of an evaluation target extraction system 10 according to a present embodiment.

As shown in FIG. 4, the evaluation target extraction system 10 according to the present embodiment includes an input unit 1, a processing unit 2, a first database 3, a second database 4, and a display unit 5. The evaluation target extraction system 10 may be composed of a personal computer or other computer devices.

The evaluation target extraction system 10 is also connected to a wiring drawing system 20. The wiring drawing system 20 is also composed of a computer device.

[Outline of the Evaluation Target Extraction System 10]

The input unit 1 is a section into which an instruction required for extracting the evaluation target A (a one-bundle risk) and the evaluation target B (a simultaneous failure risk) is input. The input unit 1 may be composed of a keyboard as an input device of a computer.

The processing unit 2 reads out information stored in the first database 3 and the second database 4 according to an instruction from the input unit 1, performs necessary processing for extracting information regarding the evaluation targets A and B, and displays the extracted information on the display unit 5.

The first database 3 stores risk information of each of a plurality of systems, devices, components, and harnesses, connectors, bundles, and electric wires (collectively referred to as system constituent element below) that constitute a target of safety analysis in correlation with the corresponding system. The first database 3 also stores an assumed hazard source in an analysis target and an influenced area by the hazard source in correlation with each other in addition to the above risk information. The risk information is acquired by preliminarily performing safety analysis on each system and each hazard event.

The second database 4 acquires and stores wire harness information and wiring information regarding the above system constituent elements from the wiring drawing system 20. The specific contents of the wire harness information and the wiring information will be described below.

The display unit 5 displays a result processed by the processing unit 2. The display unit 5 may be composed of a display as a display device of a computer.

[Outline of the Wiring Drawing System 20]

The wiring drawing system 20 includes a CAD (Computer Aided Design) 21. The CAD 21 acquires connection/location information regarding the system constituent elements in association with a wiring design work, and creates wire harness diagrams (simply referred to as WHD below), and wiring diagrams (simply referred to as WD below). The WHD shows a connection relationship between a connector and a bundle (including a bundle section and a node). The WD shows a connection relationship between an electric wire and a connector included in a harness.

The CAD 21 provides the acquired connection/location information to the second database 4 of the evaluation target extraction system 10. The second database 4 stores the connection/location information provided from the CAD 21.

In the connection/location information (wire harness information) based on the WHD, identification information of the harnesses (Harness ID), identification information of the bundle sections (Bundle ID), identification information of the nodes (Node ID), and location information (three-dimensional location x, y, z) are correlated with each other. In the connection/location information (wiring information) based on the WD, identification information of the harnesses (Harness ID), identification information of the electric wires (Wire ID), identification information of the connectors and the connector pins (Conc. ID/Pin ID), and location information (three-dimensional location x, y, z) are correlated with each other. Although the wire harness information and the wiring information are separately described, the wire harness information and the wiring information may be integrally treated since both the wire harness information and the wiring information include the identification information of the harnesses (Harness ID).

A procedure for extracting the evaluation target by the evaluation target extraction system 10 will be described by reference to FIGS. 5 to 14.

Although an example in which the present embodiment is applied to aircraft will be described, it goes without saying that the present invention can be also applied to another large-scale system, such as atomic power generation, in which the safety is important. In the following, a method for extracting a harness having a one-bundle possibility (a method for extracting the evaluation target A), and a method for extracting harnesses having a risk to impair the safety when failing at the same time in the incidence of a hazard event (a method for extracting the evaluation target B) will be individually described. The evaluation target extraction system 10 may also extract both the targets together.

<Method for Extracting the Evaluation Target A>

[Extraction of System Risk Information]

Figure 5:
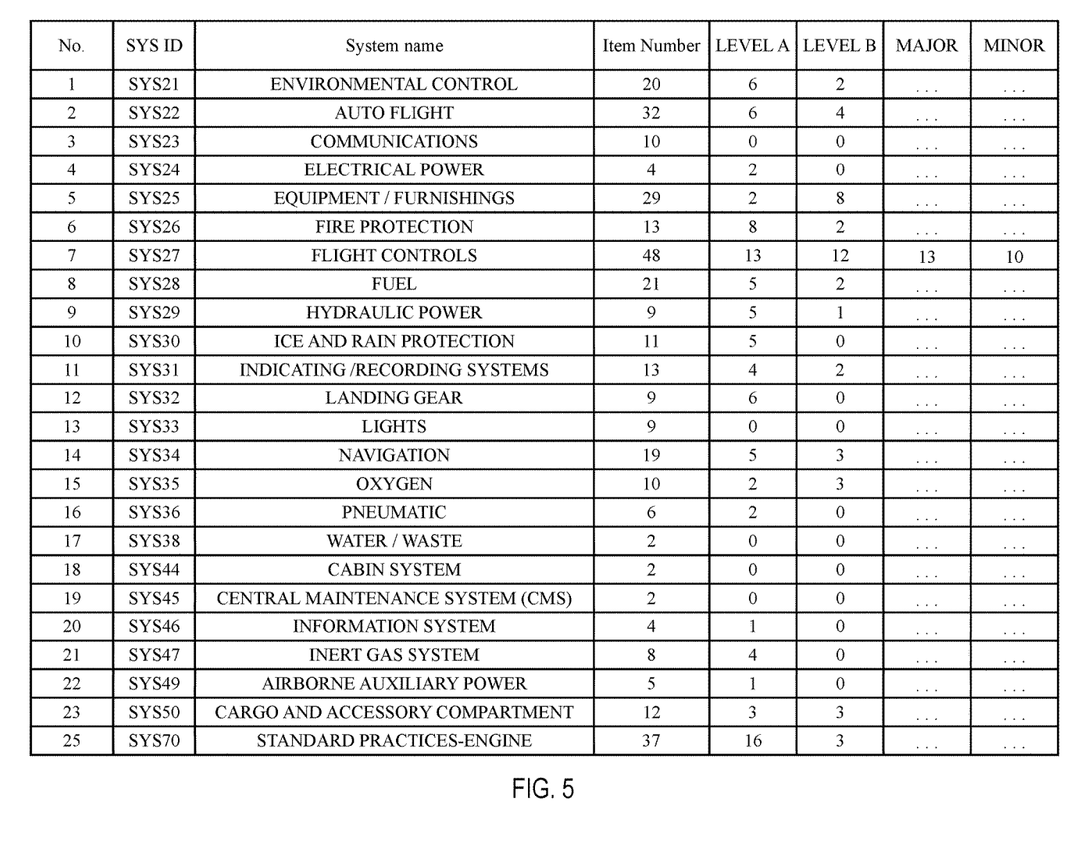
FIG. 5 is a view illustrating system risk information according to the present embodiment.

First, extraction of "system risk information" is instructed from the input unit 1. The processing unit 2 reads out the system risk information from the first database 3 based on the instruction from the input unit 1, and displays the information on the display unit 5 as a list in table form. FIG. 5 shows one example of the "system risk information".

As shown in FIG. 5, the "system risk information" is composed of respective items: "No.", "SYS ID", "System name", "Item number", "LEVEL A", and "LEVEL B".

"No." is a serial number for identifying each system listed in the system risk information. In the example, a total of 24 systems from No. 1 to No. 24 are listed.

"SYS ID" is an identification code for distinguishing each system from another system. In the example in FIG. 5, 24 identification codes from SYS21 to SYS70 are given.

"System name" indicates the name of each system that constitutes an aircraft. In the example in FIG. 5, it is shown that No. 1 is "ENVIRONMENTAL CONTROL", No. 7 is "FLIGHT CONTROLS", and No. 21 is "INERT GAS SYSTEM", which sequentially correspond to "SYS21", "SYS27", and "SYS47" as the "SYS ID", respectively.

In the case of the example in FIG. 5, superordinate identification information regarding all of SYS21 to SYS70, or individual identification information from SYS21 to SYS70 may be input as the instruction from the input unit 1.

"Item number" indicates the sum of hazard states at respective hazard levels existing in each system (system risks).

The hazard level means the "Catastrophic Failure", the "Hazardous Failure", the "Major", and the "Minor" described above. For example, when the "Catastrophic Failure" is 13, the "Hazardous Failure" is 12, the "Major" is 13, and the "Minor" is 10, the "Item number" is 48.

"LEVEL A" and "LEVEL B" respectively indicate the number of hazard states defined as the "Catastrophic Failure", and the number of hazard states defined as the "Hazardous Failure" among all the hazard events. For example, it is shown that the number of hazard states defined as the "Catastrophic Failure" is 13, and the number of hazard states defined as the "Hazardous Failure" is 12 in a system related to No. 7 "FLIGHT CONTROLS" with "SYS27".

[Extraction of Device Risk Information]

Figure 6:
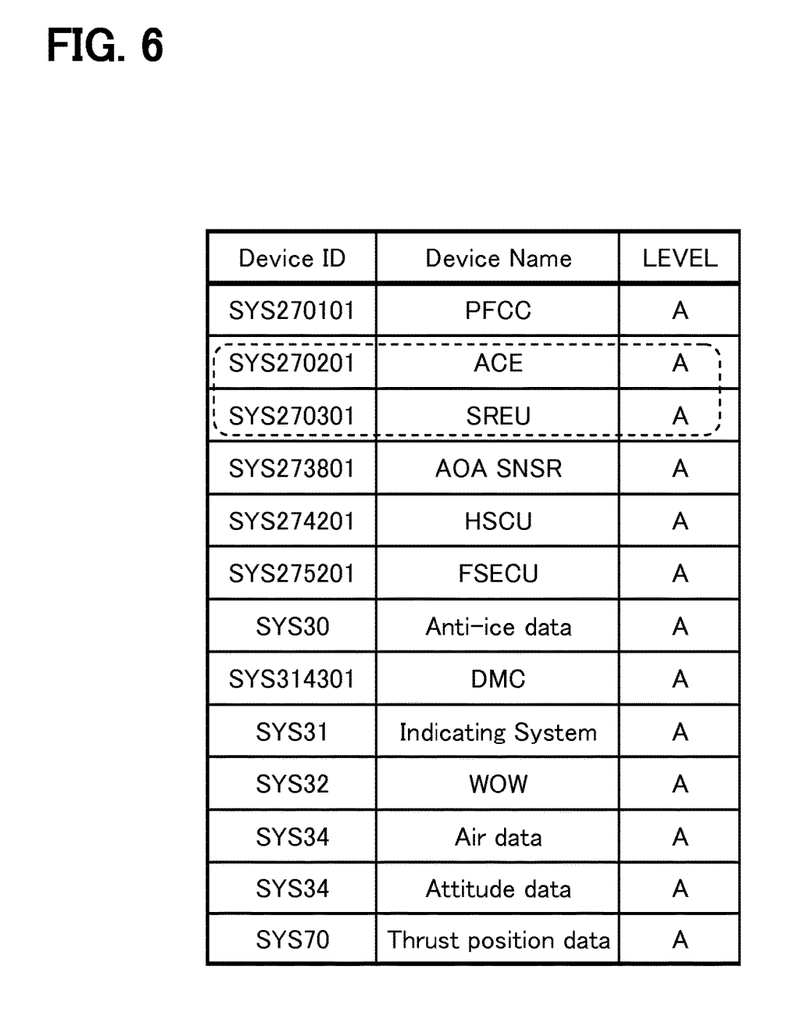
FIG. 6 is a view illustrating device risk information according to the present embodiment.

FIG. 6 shows the breakdown of the 13 "Catastrophic Failure" conditions of the "FLIGHT CONTROLS" system described above. The breakdown shows a failure level (device risk information) of each device that constitutes the "FLIGHT CONTROLS" system. The breakdown is composed of three items: "Device ID", "Device name", and "LEVEL".

"Device ID" is an identification code for distinguishing each device from another device. In the example in FIG. 6, 13 identification codes from SYS 270101 to SYS 70 are described.

"Device name" indicates the name (abbreviated name) of each device that constitutes each system listed in the "System name" in FIG. 5. In the example in FIG. 6, it is shown that the name of a device whose "Device ID" is SYS270201 is "ACE", and the name of a device whose "Device ID" is SYS270301 is "SREU".

"LEVEL" indicates the failure level of each device. In the example, all the devices fall into the "Catastrophic Failure" condition. Thus, "A" is inserted into all the spaces of "failure level". When the "Hazardous Failure" condition is targeted, "B" is inserted into all the spaces of "failure level".

The device risk information described above is also stored in the first database 3. The device risk information is stored in correlation with the system risk information shown in FIG. 5. For example, when "SYS27" is selected as the SYS ID from the system risk information listed in FIG. 5, the device risk information shown in FIG. 6 can be displayed on the display unit 5.

Although the system identified by "FLIGHT CONTROLS" has been exemplified above, device risk information on devices constituting each system listed in FIG. 5 can be also similarly read out, and displayed on the display unit 5.

[Component Extraction]

Figure 7:
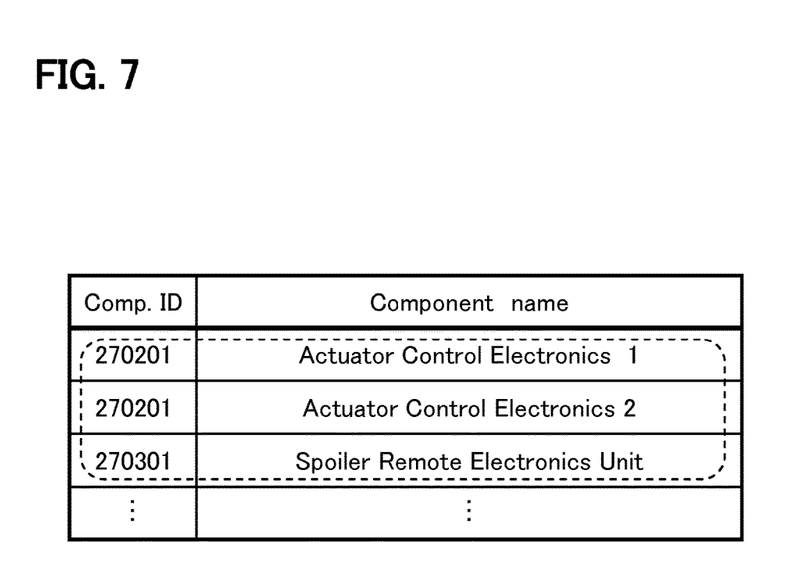
FIG. 7 is a view illustrating components included in the device risk information shown in FIG. 6.

Next, in FIG. 7, a component ("Component") that constitutes each device shown in the "Device name" in FIG. 6 is extracted and displayed with "Comp. ID". In FIG. 7, components constituting the "ACE" and the "SREU" out of the respective devices in FIG. 6 are exemplified. In the example in FIG. 7, the "ACE" includes two components (Actuator Control Electronics 1, and Actuator Control Electronics 2). The "SREU" includes one component (Spoiler Remote Electronics Unit).

The information regarding the components shown in FIG. 7 is also stored in the first database 3, and stored in correlation with the "Device ID" in the device risk information shown in FIG. 6. When "SYS270201" and "SYS270301" are selected as the Device ID from the device risk information listed in FIG. 6, the component information shown in FIG. 7 can be displayed on the display unit 5.

[Extraction of Connector-harness Information]

Next, a relationship (connector-harness information) between component connectors (referred to as connector below) of the above three components identified in FIG. 7, and harnesses connected to the connectors is extracted and shown in FIG. 8.

Figure 8:
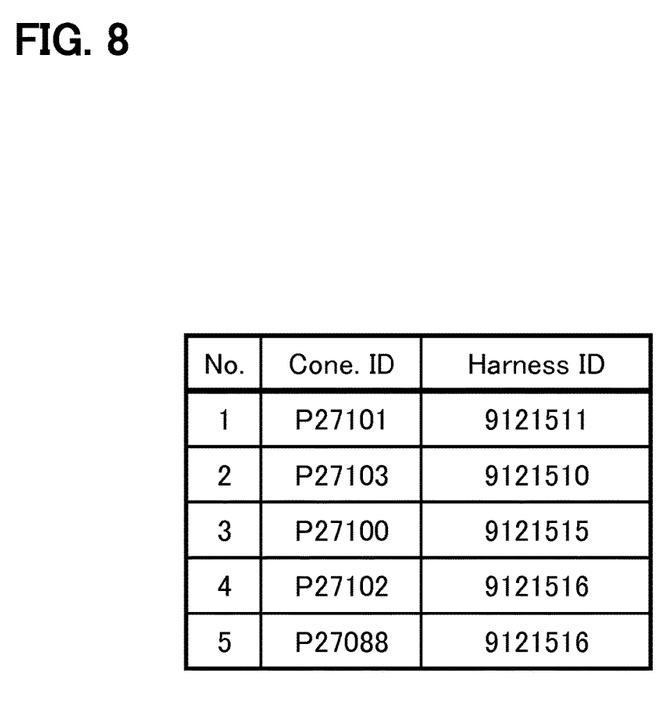
FIG. 8 is a view illustrating connectors and harnesses connected thereto shown in FIG. 7.

As shown in FIG. 8, each connector is given an identification code (P27101, P27103, P27100, and so on) for distinguishing the respective connectors as "Cone. ID". That is, FIG. 8 shows that the three components include a total of five connectors. To be more specific, the "Actuator control Electronics 1" and the "Actuator control Electronics 2" include a total of four connectors (P27101, P27103, P27100, P27102), and the "Spoiler Remote Electronics Unit" includes one connector (P27088).

Each harness as a bundle of electric wires connected to each connector ("Cone. ID") is also given an identification code as "Harness ID". To be more specific, it is shown that a single harness is connected to two connectors identified by P27102 and P27088 since the connectors have the same "Harness ID".

The connector-harness information shown in FIG. 8 is stored in the second database 4. When "270201" and "270301" are selected as the Comp. ID from the component information listed in FIG. 7 via the input unit 1, the connector-harness information shown in FIG. 8 can be displayed on the display unit 5.

[Evaluation Target Extraction]

Next, the evaluation target is extracted based on the acquired connector-harness relation information.

The evaluation target is extracted by searching the above wiring information by using as a keyword a basic event in the correlation information between the connectors and the harnesses shown in FIG. 8. The wiring information is stored in the second database 4 as described above. The processing unit 2 reads the wiring information from the second database 4 so as to extract the evaluation target.

Figure 9:
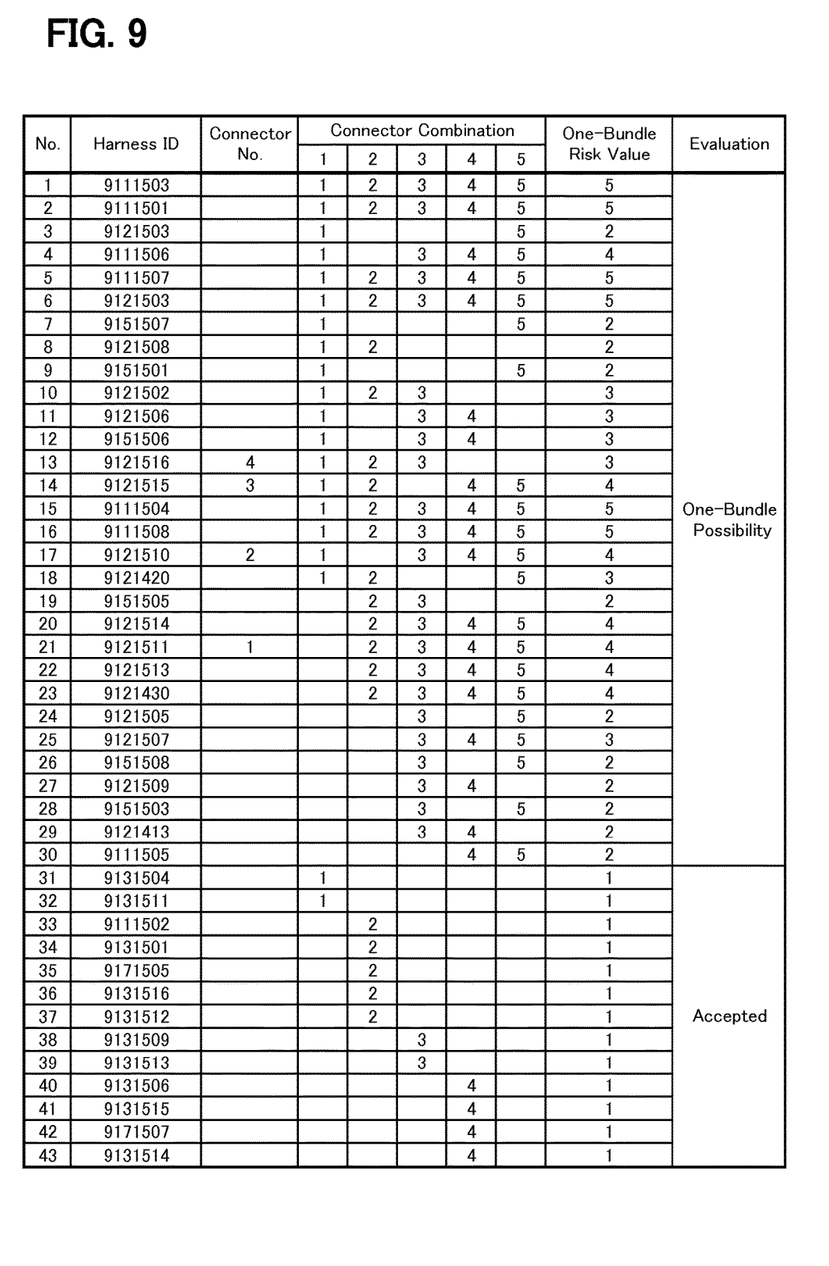
FIG. 9 is a view listing one-bundle risk values of harnesses directly or indirectly connected to the connectors shown in FIG. 8.

FIG. 9 shows a search result.

FIG. 9 shows information displayed on the display unit 5 as a result processed by the processing unit 2. It is shown that the five connectors (the basic event) shown in FIG. 8 are connected to terminal devices via 43 harnesses.

Harnesses required to be evaluated may be also respectively extracted and displayed with respect to all the failure conditions before obtaining the result in FIG. 9. For example, in the display, the harnesses and the failure conditions are listed in rows/columns (in matrix). The evaluation target A or the evaluation target B is described in a cell at an intersection therebetween.

The searching steps may be performed as described below.

Step 1: All the Cone. IDs in a combination, which should not fail at the same time, are input from the input unit 1.

Step 2: The processing unit 2 acquires information on all the PINs belonging to the input Cone. IDs based on the wiring information.

Step 3: The processing unit 2 sequentially searches electric wires electrically connected to the above PINs until reaching a terminal device based on the wiring information, and acquires all the identification codes of harnesses (Harness ID) in which the electric wires are bundled together.

Step 4: Steps 2 and 3 are performed on all the connectors.

Step 5: Results are summarized as shown in FIG. 9 and analyzed after the searches of all the connectors are completed in step 4.

The Cone. IDs in a combination, which should not fail at the same time, are stored in the first database 3 as one of the risk information.

The other contents of the information listed in each space in FIG. 9 are as follows.

The identification code of each harness extracted by the search is described in the space of "Harness ID".

A number corresponding to "No." shown in FIG. 8 is described in the space of "Connector No.". For example, the "Connector No." of "No. 13" in FIG. 9 is "4", which corresponds to "4" in the space of "No." in FIG. 8, and indicates the connector identified by P27102. Similarly, the "Connector No." of "No. 17" in FIG. 9 is "2", which corresponds to "2" in the space of "No." in FIG. 8, and indicates the connector identified by P27103. One with a blank space in the "Connector No." in FIG. 9 indicates that the harness is indirectly connected to the five connectors shown in FIG. 8. For example, a harness (first generation) connected to the connector shown in FIG. 8 is connected to a mating connector paired with the connector, and the mating connector is connected to a terminal device. A mating connector is further connected to the terminal device, and a harness (second generation) is drawn out therefrom. In this case, a harness with a number (1 to 5) in the "Connector No." in FIG. 9 falls into the first-generation harness, and a harness with a blank space in the "Connector No." falls into the second-generation harness, or third or subsequent generation harnesses.

Next, the space of "Connector combination" indicates a connector to which the harness is connected whether directly or indirectly. The space of "Connector combination" is divided into five spaces: "1", "2", "3", "4", and "5". When a number (1 to 5) is inserted into any of the spaces, the harness is connected to a connector corresponding to the number. For example, as for "No. 1" (the uppermost row) in FIG. 9, numbers are inserted into all the "Connector combination" spaces of "1", "2", "3", "4", and "5". This means that a harness identified by "9111503" (Harness ID) is connected to the five connectors whether directly or indirectly. As for a harness identified by "9121516" (Harness ID) of "No. 13" in FIG. 9, numbers are inserted into the "Connector combination" spaces of "1", "2", and "3". This means that the harness identified by "9121516" (Harness ID) is connected to three connectors (P27101, P27103, P27103) whether directly or indirectly.

Next, the space of "One-bundle risk value" indicates the sum of the "Connector combination" spaces into which numbers are inserted. For example, as for "No. 1" in FIG. 9, numbers are inserted into all the five "Connector combination" spaces. Thus, the "One-bundle risk value" is 5. As for "No. 13" in FIG. 9, numbers are inserted into the three "Connector combination" spaces. Thus, the "One-bundle risk value" is 3. The connector described in the "Connector No." space is not added to the "One-bundle risk value". That is, the "One-bundle risk value" indicates the number of connectors indirectly connected. However, it goes without saying that the directly connected connector described in the "Connector No." space may be added.

Independence is ensured for a harness whose "One-bundle risk value" is 1 since the harness is not connected whether directly or indirectly to a connector to which another harness is connected. That is, 13 harnesses from "No." 31 to 43 in FIG. 9 are not in "one bundle" with another harness, and thus, can be removed from the evaluation target from the perspective of the one-bundle risk. A harness whose "One-bundle risk value" is 2 or more is connected whether directly or indirectly to a connector to which another harness is connected. That is, 30 harnesses from "No." 1 to 30 in FIG. 9 are possibly in "one bundle" with another harness, and thus, extracted as the evaluation target A from the perspective of the one-bundle risk. However, even the harness whose "one-bundle risk value" is 1 may be extracted as the evaluation target B.

The processing procedure for extracting the evaluation target A by the evaluation target extraction system 10 is completed as described above. Subsequently, a designer or other experts of each system checks the WHD and the WD previously created by the CAD 21, and thereby checks each harness extracted as the evaluation target A on whether or not the safety is guaranteed by ensuring a redundant system. When the redundant system is ensured, the wiring is left as it is. If not, a wiring structure of a corresponding portion is changed.

[Safety Determination]

Next, a method for determining the safety of the harness extracted as the evaluation target A will be described. Examples of the method include a first method and a second method described below. In the following, the methods will be sequentially described. Either or both of the methods may be employed. Both the first method and the second method can be applied to an extraction result of the evaluation target B described below. The first method and the second method are merely one example, and another method may be also employed.

(1) First Method

An example of the first method will be described by reference to FIG. 10.

Figure 10:
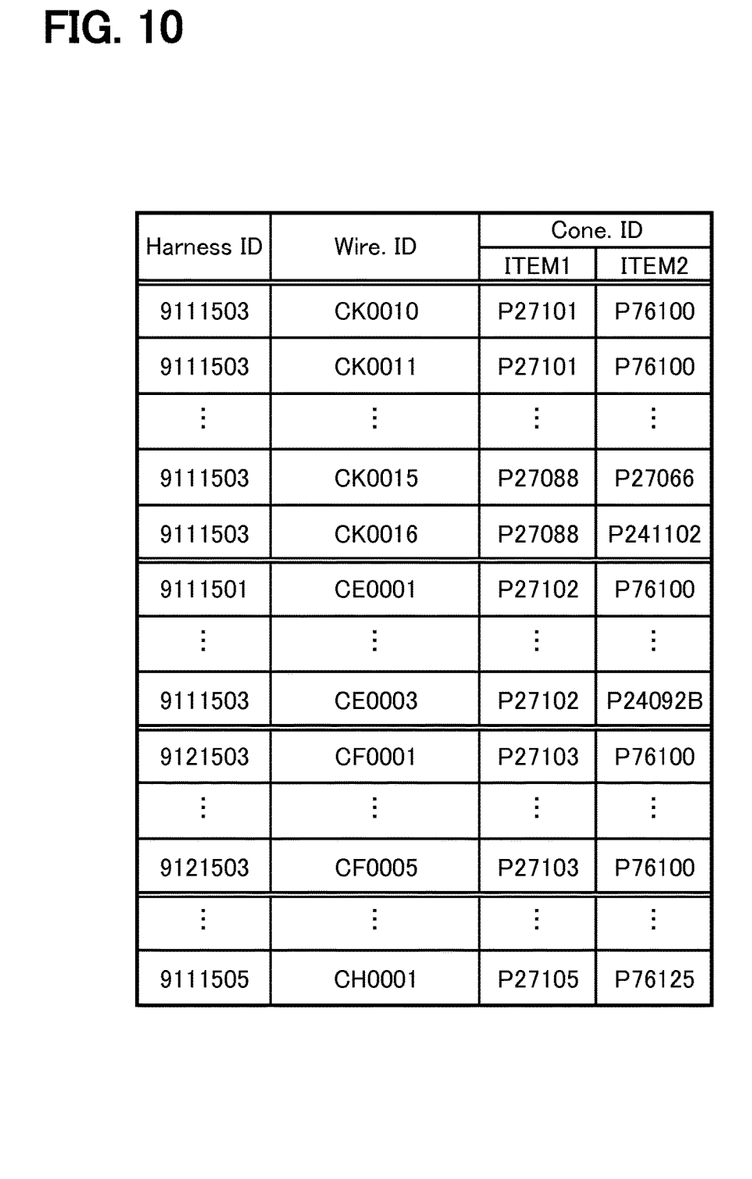
FIG. 10 is a view illustrating information in which wire harnesses and electric wires are correlated with each other, for use in a first method for determining the safety of each harness.

FIG. 10 shows a result of extracting electric wires included in each harness shown in FIG. 9. To extract the electric wires, the processing unit 2 reads out the electric wires from the second database 4 and lists the electric wires by inputting the identification information of the harness from the input unit 1.

FIG. 10 shows the identification information of each harness (Harness ID), the identification information of each electric wire (Wire ID) included in the harness, and the identification information of a pair of connectors (Cone. ID ITEM1, ITEM2) connected to both ends of the electric wire in correlation with each other. For example, FIG. 10 shows that an electric wire identified by Wire ID of CK0010 is bundled in a harness whose Harness ID is 9111503, and a connector identified by ITEM1 of P27101 as the Cone. ID, and a connector identified by ITEM2 of P76100 as the Cone. ID are connected to both ends of the electric wire.

An expert refers to the WD and the WHD with respect to each of the electric wires extracted as described above, and thereby evaluates the influence rate when the electric wires fail at the same time.

(2) Second Method

In the second method, the influence rate is evaluated by using node information and bundle section information. The processing unit 2 can read out the node information and the bundle section information from the second database 4 by inputting the identification information of the connector from the input unit 1.

In the wiring system, following cases 1 to 3 are assumed.
Case 1: Connector A (Cone. ID=P76100), Node A (Node ID=P3C061)
Connector B (Cone. ID=P27101), Node B (Node ID=J3C055)
Case 2: Connector C (Cone. ID=P27102), Node C (Node ID=P3C073)
Connector D (Cone. ID=P24092B), Node D (Node ID=P24092B)
Case 3: Connector B (Cone. ID=P27101), Node B (Node ID=J3C055)
Connector E (Cone. ID=P27103), Node E (Node ID=J3C036)

A node existing between the connector A and the connector B (case 1), and a node existing between the connector C and the connector D (case 2) are as follows. Case 1 (Node ID): N3CL 002, N3CL 001, N3CL 003, N3CL 007 Case 2 (Node ID): N3CL 002, N3CL 001, N3CL 003, N3CL 004, N3CL 006

The node existing between the connector C and the connector D (case 2) (listed again), and a node existing between the connector B and the connector E (case 3) are as follows.
Case 2 (Node ID): N3CL 002, N3CL 001, N3CL 003, N3CL 004, N3CL 006
Case 3 (Node ID): N3CL 007, N3CL 008

Based on the above premise, it is found that there exist common nodes by matching the case 1 and the case 2, and that there exists no common node by matching the case 2 and the case 3. In the latter case (no common node), it is determined that there is no one bundle between the cases. In the former case, it is determined that there is a one-bundle possibility. Thus, a bundle (bundle section) existing between the common nodes is identified. In the case of the above example, the following two bundles are identified.
Identified bundle (Bundle ID): BS3CL 002, BS3CL 005

Subsequently, all electric wires bundled in the identified bundles are extracted. The influence rate when the electric wires fail at the same time is evaluated with respect to the respective electric wires. The electric wires may be extracted and the influence rate may be evaluated in a similar manner to those of the first method.

<Method for Extracting the Evaluation Target B>

Next, the method for extracting harnesses having a risk to impair the safety when failing at the same time in the incidence of a hazard event will be described.

Figure 11:
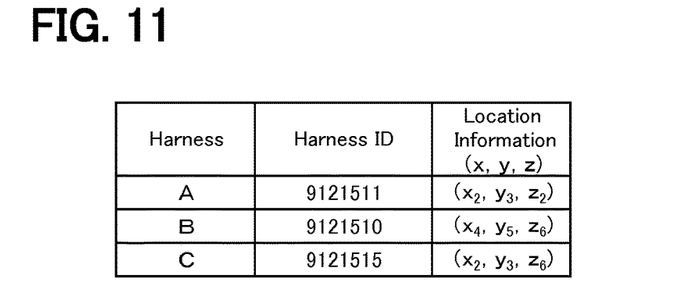
FIG. 11 shows information in which harnesses and location information (x, y, z) are correlated with each other.

Harnesses as the evaluation target B are identified, and their identification codes (Harness ID) are input into the input unit 1. Here, three harnesses A to C (Harness ID=9121511, 9121510, 9121515) constituting three redundancies (three systems) will be exemplified. The processing unit 2 refers to the second database 4 so as to read out the location information of the Harness IDs input via the input unit 1. An example of the read-out location information is shown in FIG. 11, in which the Harness IDs and the location information (x, y, z) are correlated with each other. Since the harnesses A to C are wired in a system, each harness has a plurality of location information that identifies a region in which the harness is wired. FIG. 11 shows only one location information as a representative.

Figure 12:
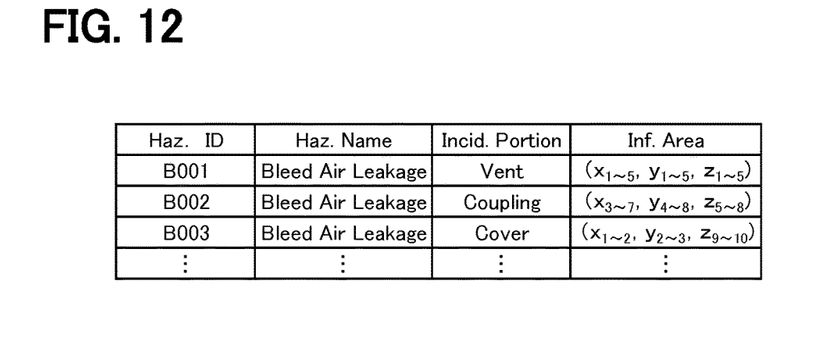
FIG. 12 shows information regarding hazard sources.

The processing unit 2 also reads out hazard source information from the first database 3. An example of the read-out hazard source information is shown in FIG. 12, in which the identification information of each hazard source (Haz. ID), the name of each hazard source (Haz. name), the incidence portion (Incid. portion), and the influenced area (Inf. area) are correlated with each other. The hazard source means a component or other elements which may cause a failure in an electric wire passing through the influenced area when failing.

The processing unit 2 matches the read-out harness location information to the influenced area of the hazard source information. The processing unit 2 calculates the simultaneous failure risk value of a harness whose location information is within the influenced area as 1, and calculates the simultaneous failure risk value of a harness whose location information is out of the influenced area as 0. For example, when the influenced area is ($x_{1\ to\ 5}$, $y_{1\ to\ 5}$, $z_{1\ to\ 5}$), the simultaneous failure risk value of the harness A whose location information is ($x_2$, $y_3$, $z_2$) is calculated as 1, and the harness C whose location information is ($x_2$, $y_3$, $z_6$) is calculated as 0.

Figure 13:
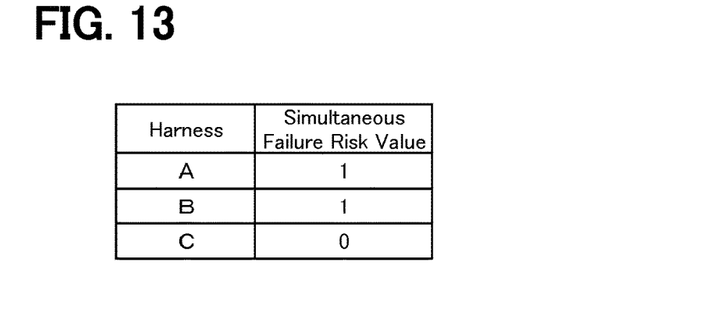
FIG. 13 shows calculation results of simultaneous failure risk values.

Calculation results of the risk values described above are displayed on the display unit 5 as a list in table form. One example thereof is shown in FIG. 13. In the example, it is shown that, among the three harnesses A to C (Harness ID=9121511, 9121510, 9121515), the two harnesses A and B have a simultaneous failure risk value of 1, that is, a risk to impair the system safety when failing at the same time, and the remaining harness C has no risk to impair the system safety even when failing at the same time.

Figure 14:
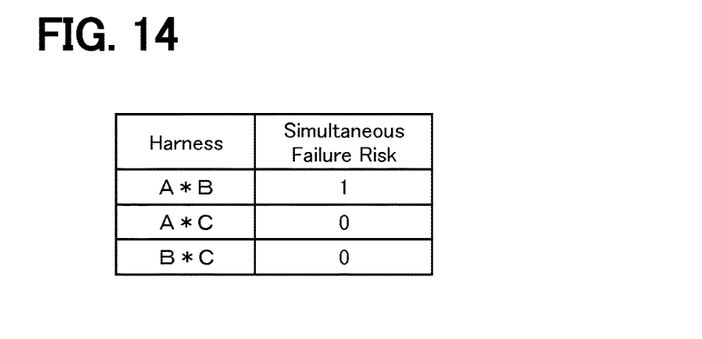
FIG. 14 shows calculation results of simultaneous failure risks.

Subsequently, the processing unit 2 can perform a process for determining a simultaneous failure risk by using the acquired simultaneous failure risk values. The process is performed by multiplying the simultaneous failure risk values of two harnesses out of the three harnesses A to C. Calculation results of the risk determination are displayed on the display unit 5 as a list in table form. One example thereof is shown in FIG. 14. In the example, the simultaneous failure risk of a combination of the harness A and the harness B both having a simultaneous failure risk value of 1 is calculated as 1. The simultaneous failure risks of a combination of the harness A and the harness C, and a combination of the harness B and the harness C are calculated as 0.

The combination of the harness A and the harness B whose simultaneous failure risk is calculated as 1 can be recognized to have a risk to fail at the same time. The combination of the harness A and the harness C, and the combination of the harness B and the harness C can be recognized to have no risk to fail at the same time. Based on the recognition results, a design change may be determined to be performed on one of the harness A and the harness B so as to change the rigged position. Alternatively, more detailed evaluation on whether or not there is a risk of failing at the same time may be determined to be performed.

The determination may be also made by referring to the simultaneous failure risk values shown in FIG. 13. That is, since the simultaneous failure risk values of both the two harnesses A and B are 1, the rigged position of one of the harness A and the harness B may be determined to be changed.

As described above, by making a database of the information regarding the relationship between the connectors and the harnesses (electric wires) connected to the connectors, and the hazard sources, a wiring state including connection destinations of first to n-th generation harnesses or the like can be extracted by searching necessary information even in a large-scale wiring system used for manufacturing aircraft. Thus, the "one-bundle risk value" and the "simultaneous failure risk value" can be easily obtained.

It goes without saying that the wiring structure used for describing the above embodiment is merely one example, and the present invention can be also applied to another wiring structure.

The devices and the components to which the wiring structure is applied are not limited. The present invention can be applied to various devices and components in which a terminal device and a relay device are connected by an electric wire.

In addition, the configurations employed in the above embodiment may be appropriately selected and eliminated, or appropriately changed to another configuration without departing from the scope of the present invention.

What is claimed is:

1. A method for determining a wiring risk, comprising:
identifying a number of connectors to which a target harness identified from a plurality of harnesses is indirectly connected;
determining, based on the identified number of connectors, a first risk that electric wires connected to a plurality of terminal devices are bundled into a single harness;
matching location information of the target harness to an influenced area by a hazard source;
identifying whether the target harness passes through the influenced area; and
determining, based on the matched location information and identification of whether the target harness passes through the influenced area, a second risk that harnesses fail at the same time in a wiring system in which the plurality of harnesses are provided between the plurality of terminal devices and connected via connectors; and
changing at least one of the plurality of harnesses based on the determined first risk or the determined second risk in a manner that reduces the determined first risk or the determined second risk.

2. The method for determining a wiring risk according to claim 1, further comprising extracting identification information of an electric wire bundled in the target harness from a connection information between the connector and the harness, the target harness having a risk value corresponding to the identified number of connectors equal to or larger than a predetermined value, wherein the first risk is determined based on the extracted identification information.

3. The method for determining a wiring risk according to claim 2, further comprising calculating respective risk values indicating that the two target harnesses pass through the influenced area, wherein the second risk is determined based on the respective risk values.

4. The method for determining a wiring risk according to claim 1, further comprising extracting identification information of a node as a branching portion of the target harness, the target harness having a risk value corresponding to the identified number of connectors equal to or larger than a predetermined value, wherein the first risk is determined based on the extracted identification information.

5. The method for determining a wiring risk according to claim 4, further comprising calculating respective risk values indicating that the two target harnesses pass through the influenced area, wherein the second risk is determined based on the respective risk values.

6. The method for determining a wiring risk according to claim 1, further comprising calculating respective risk values indicating that the two target harnesses pass through the influenced area, wherein the second risk is determined based on the respective risk values.

7. The method for determining a wiring risk according to claim 1, wherein changing the at least one of the plurality of harnesses comprises changing a rigged position of the at least one of the plurality of harnesses.

8. The method for determining a wiring risk according to claim 1, wherein the connectors, the plurality of harnesses, and the electric wires are part of a wiring system of an aircraft.

9. A wiring risk determination system which determines a first risk that electric wires connected to a plurality of terminal devices are bundled into a single harness, and a second risk that harnesses fail at the same time in a wiring system in which a plurality of harnesses, each as a bundle of electric wires, are provided between the plurality of terminal devices and connected via connectors, the system comprising:
a display,
a database that stores connection information between the connector and the harness, location information of the harnesses, and information on an influenced area by a hazard source, and
a processing unit configured to:
determine the first risk and determine the second risk,
when a target harness identified from the plurality of harnesses is specified, identify the number of connectors to which the target harness is indirectly connected based on the connection information so as to determine the first risk,
match the location information of the target harness to the influenced area information, and
identify whether the target harness passes through the influenced area so as to determine the second risk;
calculate a simultaneous failure risk value of at least one of the plurality of harnesses based on the determined first risk or the determined second risk;
determine a change to at least one of the plurality of harnesses to be made based on the calculated simultaneous failure risk value, wherein the change reduces the determined first risk or the determined second risk; and
display the determined change on the display.

10. The wiring risk determination system according to claim 9, wherein in the determination of the first risk, the processing unit is further configured to extract identification information of an electric wire bundled in the target harness from the connection information, the target harness having a risk value corresponding to the identified number of connectors equal to or larger than a predetermined value.

11. The wiring risk determination system according to claim 10, wherein in the determination of the second risk, the processing unit is further configured to obtain the second risk of two target harnesses by calculating respective risk values indicating that the two target harnesses pass through the influenced area.

12. The wiring risk determination system according to claim 9, wherein in the determination of the first risk, the processing unit is further configured to extract identification information of a node as a branching portion of the target harness, the target harness having a risk value corresponding to the identified number of connectors equal to or larger than a predetermined value, from the connection information.

13. The wiring risk determination system according to claim 12, wherein in the determination of the second risk, the processing unit is further configured to obtain the second risk of two target harnesses by calculating respective risk values indicating that the two target harnesses pass through the influenced area.

14. The wiring risk determination system according to claim 9, wherein in the determination of the second risk, the processing unit is further configured to obtain the second risk of two target harnesses by calculating respective risk values indicating that the two target harnesses pass through the influenced area.

15. The method for determining a wiring risk according to claim 1, further comprising determining a third risk, of the target harness, corresponding to the identified number of connectors.

16. The wiring risk determination system according to claim 9, wherein the processing unit is further configured to determine a third risk, of the target harness, corresponding to the identified number of connectors.

17. The wiring risk determination system according to claim 9, wherein the determined change comprises a determined change to a rigged position of the at least one of the plurality of harnesses.

18. The wiring risk determination system according to claim 9, wherein the connectors, the plurality of harnesses, and the electric wires are part of a wiring system of an aircraft.

* * * * *